US010197744B2

(12) United States Patent
Miguel Giraldo et al.

(10) Patent No.: US 10,197,744 B2
(45) Date of Patent: Feb. 5, 2019

(54) OPTICAL FIBER CONNECTOR DEVICE FOR A COMPOSITE STRUCTURE, COMPOSITE STRUCTURE FOR AN AIRCRAFT, AND MANUFACTURING METHOD THEREOF

(71) Applicant: AIRBUS OPERATIONS, S.L., Getafe (ES)

(72) Inventors: Carlos Miguel Giraldo, Getafe (ES); Julio Orcha Villacorta, Getafe (ES); Manuel Paton Gutierrez, Getafe (ES); Carlos Jusdado Serrano, Getafe (ES)

(73) Assignee: AIRBUS OPERATIONS SL, Getafe (ES)

( * ) Notice: Subject to any disclaimer, the term of this patent is extended or adjusted under 35 U.S.C. 154(b) by 0 days.

(21) Appl. No.: 15/845,350

(22) Filed: Dec. 18, 2017

(65) Prior Publication Data

US 2018/0172921 A1    Jun. 21, 2018

(30) Foreign Application Priority Data

Dec. 21, 2016 (EP) .................................... 16382635

(51) Int. Cl.
*G02B 6/38* (2006.01)
*G02B 6/44* (2006.01)

(52) U.S. Cl.
CPC ............ *G02B 6/3877* (2013.01); *G02B 6/38* (2013.01); *G02B 6/381* (2013.01); *G02B 6/3849* (2013.01); *G02B 6/3894* (2013.01); *G02B 6/3897* (2013.01); *G02B 6/44* (2013.01)

(58) Field of Classification Search
None
See application file for complete search history.

(56) References Cited

U.S. PATENT DOCUMENTS

| 2004/0017981 A1 | 1/2004 | Jovanovich et al. |
| 2007/0201808 A1 | 8/2007 | Bannister et al. |
| 2010/0166371 A1 | 7/2010 | Miguel et al. |

FOREIGN PATENT DOCUMENTS

WO    2005103786    11/2005

OTHER PUBLICATIONS

European Search Report, dated Apr. 11, 2017, priority document.

*Primary Examiner* — Jerry Rahll
(74) *Attorney, Agent, or Firm* — Greer, Burns & Crain, Ltd.

(57) ABSTRACT

An optical fiber connection device comprising a prism, first and second connection elements, inner and outer ferrules and an elastic element. The prism has an inner conduit ending in a first bore configured to receive an input optical fiber, and in a second bore configured to receive the first connection element, which, in turn, is configured to receive the second connection element. This second connection element is also configured to receive an output optical fiber. The conduit comprises two sections forming a ramp to lead the input optical fiber towards the fibers connection. The first connection element has an inner box, and the second connection element has an outer protrusion to provide a unique connecting position. The inner and outer ferrules, and the elastic element are retained in the second connection element.

17 Claims, 7 Drawing Sheets

OPTICAL FIBER CONNECTOR DEVICE FOR A COMPOSITE STRUCTURE, COMPOSITE STRUCTURE FOR AN AIRCRAFT, AND MANUFACTURING METHOD THEREOF

CROSS-REFERENCES TO RELATED APPLICATIONS

This application claims the benefit of the European patent application No. 16382635.7 filed on Dec. 21, 2016, the entire disclosures of which are incorporated herein by way of reference.

BACKGROUND OF THE INVENTION

The present invention refers to an optical fiber connection device for being used with optical fibers embedded in composite structures. The invention further refers to a composite structure including the optical fiber connection device.

Within the field of structural health monitoring of composite structures, fiber optic-based sensors are increasingly advancing with regard to other conventional instruments, becoming the only solution for some applications. Within the family of fiber optic-based sensors, Bragg network-based sensors are highly used due to their great potential. This technology is particularly being developed for measuring and monitoring structural deformations in different types of structures, such as composites.

In aeronautical structures, traditional manufacturing processes for composites enable incorporating optical fibers within the material such that, after the polymerization of the composite, a unique material-sensor system is formed. This system constitutes a smart material with detecting capabilities potentially triggered by external excitations.

These smart materials are viable from a theoretical point of view, but are considerably difficult to implement on industrial level.

One of the main problems is on the intermediate face between the different materials, and in the particular case of composite structures with embedded fiber-optic sensors, the problem is in the transition between the composite structures and an external transmitting optical fiber, namely ingress-egress area.

Another problem comes on the area of the composite structure that contains the optical fiber since it presents different geometric and mechanical properties, introducing thereby a particularly delicate point in the composite structure.

Thus, integrating the optical fiber into composites structures by embedding them inside the lay-up is not only actually one of the most attractive solutions contributing to smart composite materials, but is the optimum approach able to ensure the maximum protection and integrity of the fibers inside the structural parts against the ambient.

Thus, the intended integration level is still a challenge since there are no industrial mature solutions today fulfilling with all main necessary requirements especially with reference to the ingress-egress of the optical fiber.

It would therefore be desirable to provide technical means that offer a solution for ingress-egress of the optical fiber in composite structures fulfilling with all the necessary requirements in the mentioned structures, while providing resistant and robust connection with the structure, together with all optical performance requirements such as minimum optical insertion losses.

SUMMARY OF THE INVENTION

One object of the present invention is to provide an optical fiber connection device capable of offering an optical alignment with minimum insertion losses between the optical faces of input (embedded) and output optical fibers.

Another object of the invention is to provide an optical fiber connection device capable of offering a robust and reliable optical connection. Further, it is an object of the invention to provide a device that is resistant to structural and environmental conditions, avoiding wrinkles or any mechanical degradation on the composite structure on which it is placed.

The invention also refers to a method for manufacturing a composite structure including the optical fiber connection device.

Another object of the invention is to provide an optical fiber connection device that is compatible with the manufacturing conditions of composite structures, to be easily incorporated to the composite manufacturing process.

The present invention overcomes the above-mentioned drawbacks by providing an optical fiber connection device, a composite structure including the optical fiber connection device, and a method for manufacturing a composite structure including the optical fiber connection device, which provides a resistant and reliable connection with a composite structure, at the same time that reduces insertion losses in the optical connection between the fibers.

One aspect of the present invention refers to an optical fiber connection device comprising a metallic prism, a first connection element, a second connection element, inner and outer ferrules, and an elastic element.

The metallic prism has a planar base to lay on a composite structure. The prism has an inner conduit connecting opposing lateral surfaces of the prism. The conduit ends in first and second bores, wherein the first bore is configured to receive an input optical fiber embedded in the composite structure.

The prism is thus configured to rest on a composite structure, in which an input optical fiber is embedded occupying minimum volume on the structure. Further, the prism is configured for providing an output to the input (embedded) optical fiber.

The first connection element has a tubular shaped configuration with inner and outer ends. The inner end is configured to be inserted into the second bore of the prism to receive the input optical fiber embedded in the composite structure.

The second connection element has a tubular shaped configuration with inner and outer ends. The inner end is configured to be inserted into the first connection element. The outer end is configured to receive an output optical fiber for the connection with the input optical fiber.

Thus, the invention provides a prism to be placed on a composite structure for receiving the input (embedded) optical fiber, and first and second connection elements configured for engaging respectively the prism and the first connection element, to allow the connection with an output optical fiber.

According to the invention, the outer end of first connection element has an inner box configured to receive an outer protrusion provided at the inner end of the second connection element. Thus, the device provides a single unique position for its connection, and, thus, for the input and output optical fibers the connection. This way, the device offers an optimal optical alignment that ensures minimum insertion losses.

Further, according to the invention, the inner conduit of the prism comprises two sections following different orientations, the orientations forming a ramp having an obtuse angle to lead the input optical fiber towards the input and output optical fibers connection.

The configuration of this inner conduit provides a smooth transition for the connection between the input and output optical fibers. The invention thus avoids transversal steps between pieces, reducing the risk of breakage.

Further, with such configuration in which traditional abrupt connections are avoided, the invention enables collecting information with minimum insertion and return losses.

Also, according to the invention, the optical fiber connection device further comprises inner and outer ferrules, and an elastic element.

The inner and outer ferrules are configured to respectively receive the input and output optical fiber ends, being consecutively disposed along the inner end of the second connection element to provide a tight connection between the input and output optical fibers.

Since the device offers a single positioning for its elements, the alignment between the inner and outer ferrules is ensured, regardless of the angle of polishing previously prepared in the ferrules. This configuration thus allows using ferrules polished at any angle.

Finally, the elastic element is configured to be received into the outer end of the second connection element to press the inner and outer ferrules together, and thus connect the input and output optical fibers.

With this configuration, the invention provides an ingress-egress solution for embedded optical fibers in composite structures that reduces the risk of breakage, and minimizes optical insertion losses.

The device is adequate for being used in a Fiber Bragg Grating, and also in distributed sensing fibers, very promising technologies but more restricted in terms of dynamic ranges, and in which losses such as in the insertion and return connection are more critical. Thus, the device allows using distributed sensing fiber as the input (embedded) optical fiber.

Further, providing a prism with a planar surface to directly contact the composite structure, together with a smooth connection (not transverse) between pieces, the invention provides a device that offers a resistant connection with the structure, able to withstand environmental conditions.

Further, providing engageable pieces (prism and first and second connection elements) the invention provides a tightly connected device able to supply a reliable optical connection between the fibers after the composite curing process.

Another aspect of the invention refers to a composite structure for an aircraft that comprises an optical fiber connection device as described, and an outer composite layer disposed on the optical fiber connection device.

According to a preferred embodiment, the composite structure is at least a part of a composite skin or a stringer foot.

Finally, another aspect of the invention refers to a method for manufacturing a composite structure for an aircraft comprising the steps of providing at least one layer of composite material, providing an input optical fiber, providing at least one layer of composite material on the input optical fiber to obtain a composite structure having an embedded input optical fiber, providing an optical fiber connection device as described, and providing at least one layer of composite material on the optical fiber connection device.

The method of the invention provides an optical fiber connector integrated in composite parts, enabling the access to the interrogation of the sensors in the fiber. These sensors can provide information during the manufacturing process of the parts, such as the temperature evolution, the residual stress after curing, the mechanical behavior and even the damage reporting during in-service operation.

The method of the invention is thus compatible with the conventional manufacture of composites, sharing manufacturing conditions, trimming process and final assembly line. Thus, the method of the invention provides a simple and cost-effective way of producing composite structures with an optical fiber connector integrated thereof.

BRIEF DESCRIPTION OF THE DRAWINGS

For a better comprehension of the invention, the following drawings are provided for illustrative and non-limiting purposes, wherein:

FIG. 1a shows a schematic perspective view, FIG. 1b a longitudinal sectional view, and FIG. 1c a perspective top view of the device laid on a composite structure, such that, FIG. 1c further shows a composite structure including an optical fiber connection device according to another aspect of the present invention.

FIG. 2a shows a schematic perspective view, FIG. 2b a top view, FIG. 2c a cross-sectional view along the B-B axis depicted in FIG. 2b, and FIG. 2d a cross-sectional view along the A-A axis depicted in FIG. 2b.

FIG. 3a shows a schematic perspective view, FIG. 3b a longitudinal sectional view, and FIG. 3c a cross-sectional view.

FIG. 4a shows a schematic perspective view, FIG. 4b a longitudinal sectional view, and FIG. 4c a cross-sectional view.

FIG. 5a shows a schematic perspective view, FIG. 5b a longitudinal sectional view, and FIG. 5c a cross-sectional view.

DETAILED DESCRIPTION OF THE PREFERRED EMBODIMENTS

Figure 1A:
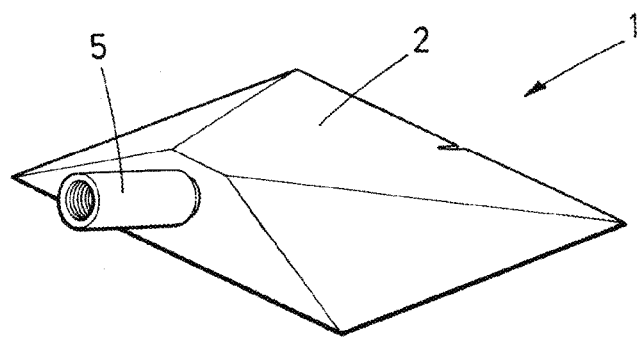
FIGS. 1a-1c show different views of an optical fiber connection device according to an embodiment of the invention.
Figure 1B:
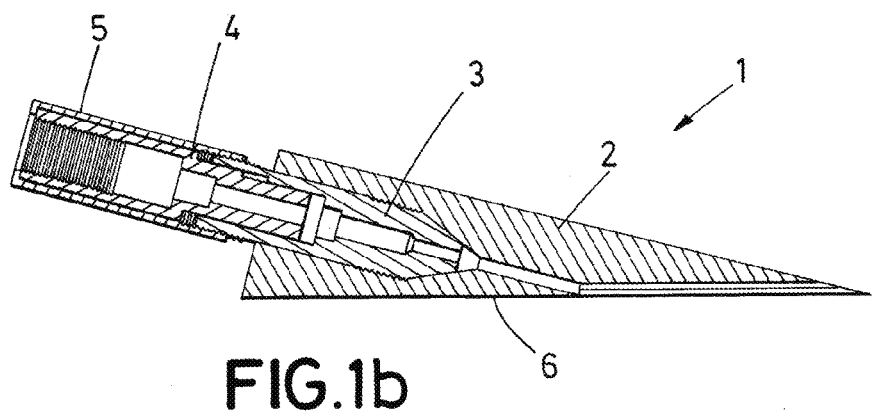

FIG. 1 shows an optical fiber connection device 1 for a composite structure 20 according to a preferred embodiment.

Figure 1C:
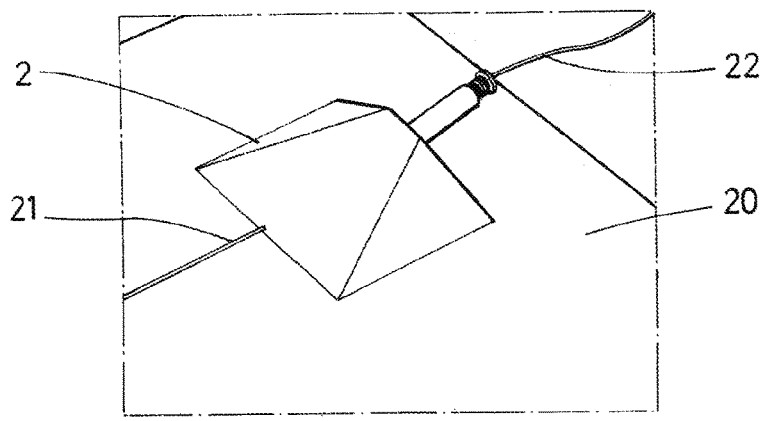

FIG. 1c shows a composite structure 20 comprising an optical fiber connection device 1. The optical fiber connection device 1 can be placed at any location on the composite surface, no longer needed, as conventionally, to be placed at one edge of the structure. Thus, the invention is compatible with trimming processes of composite structures.

Figure 6:
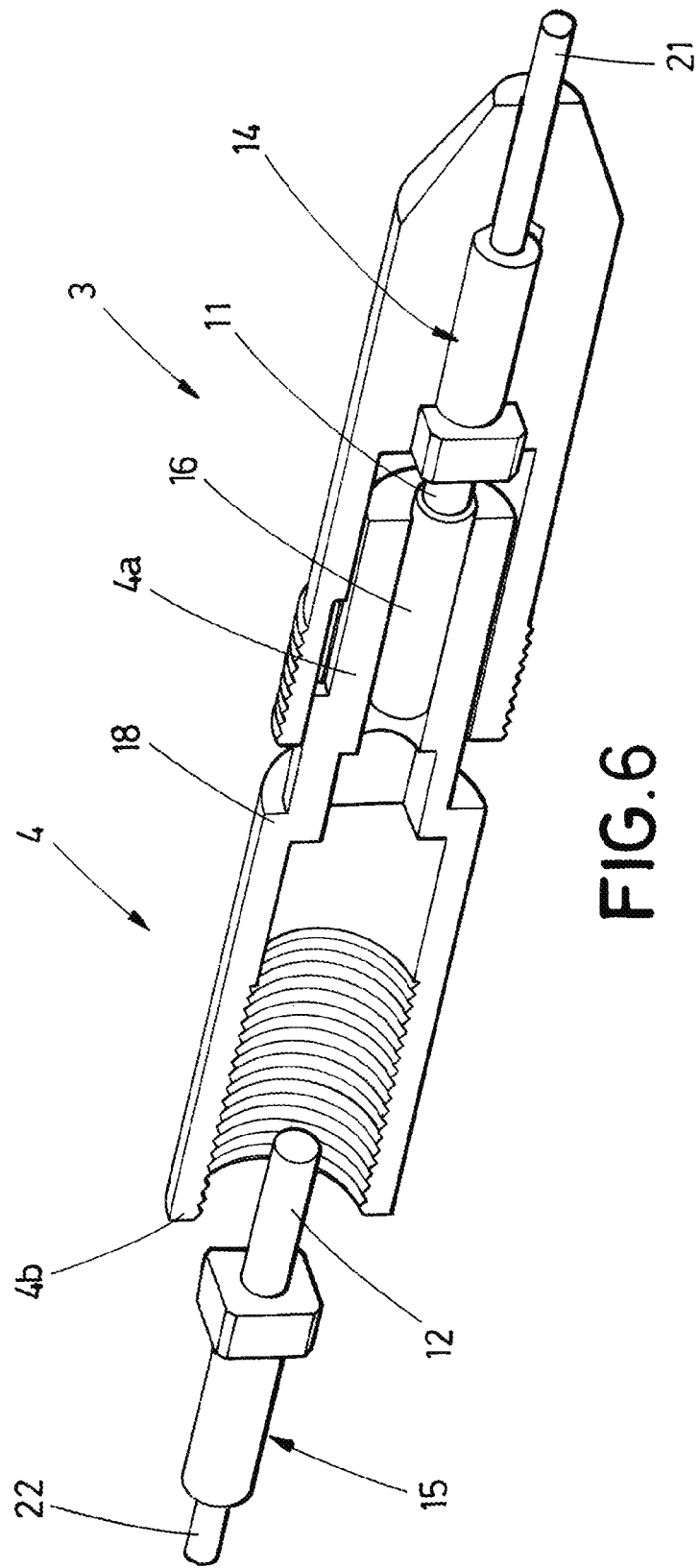
FIGS. 6-8 show different views of the pieces forming the optical fiber connection device, according to an embodiment of the invention.
Figure 7:
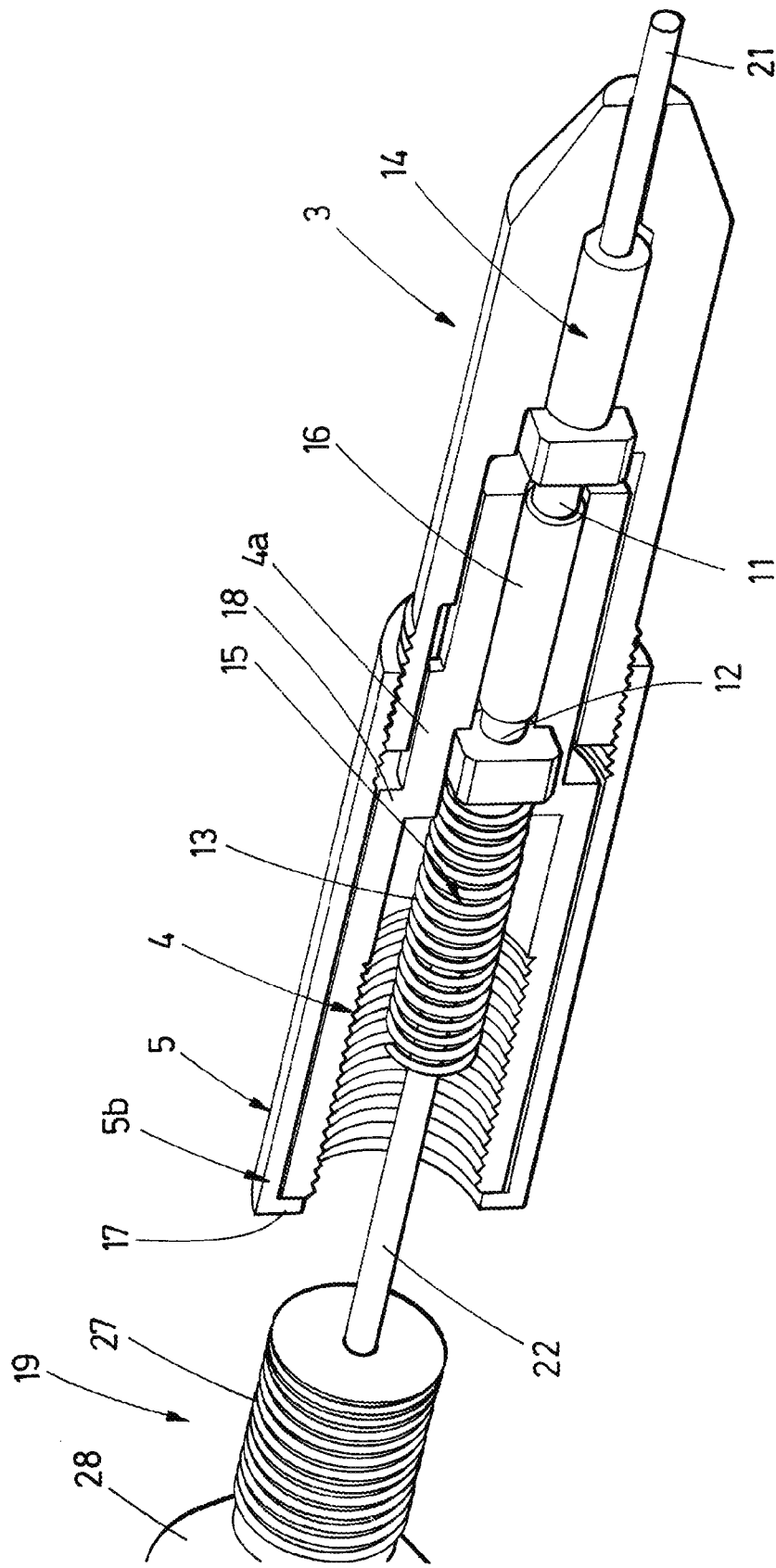
Figure 8:
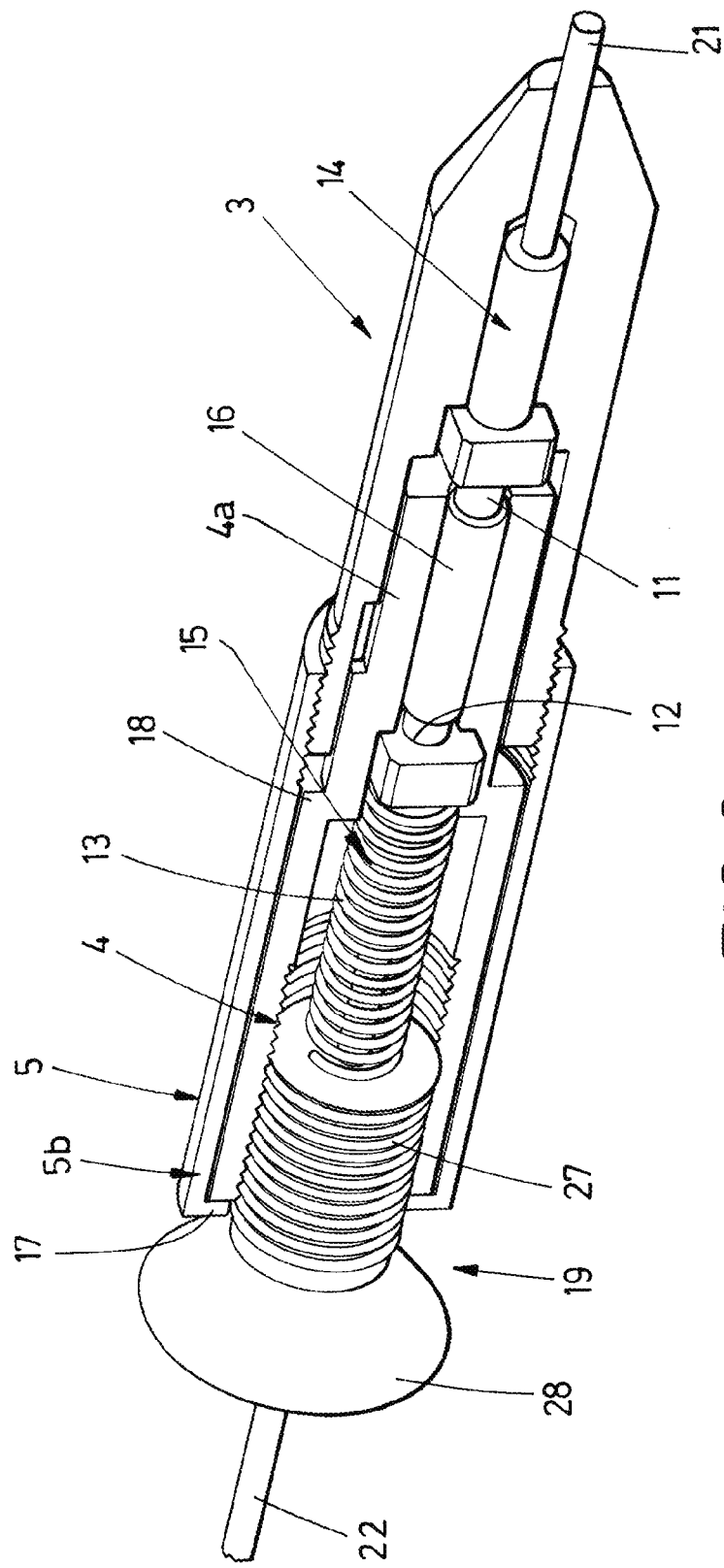

According to the invention, the device 1 at least comprises a metallic prism 2, first and second connection elements 3, 4, a closure 5, inner and outer ferrules 11, 12 (FIGS. 6-8), and an elastic element 13 (FIGS. 6-8).

As shown in FIG. 1, the prism 2 has a planar base 6 for laying on a composite structure 20 in which the input optical fiber 21 is embedded. To allow the connection of the input optical fiber 21 with an outer optical fiber 22, the prism 2 is further provided with an inner conduit 7. The conduit 7 ends in first and second bores 8, 9.

Figure 2A:
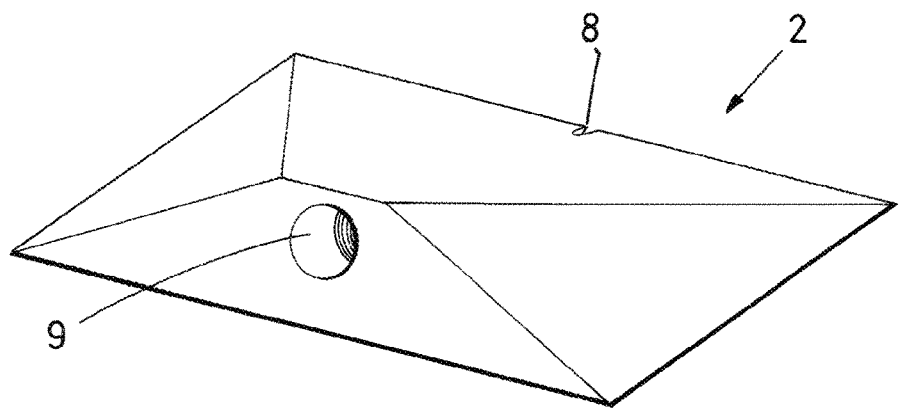
FIGS. 2a-2d show different views of a prism according to an embodiment of the invention.
Figures 2B, 2C:
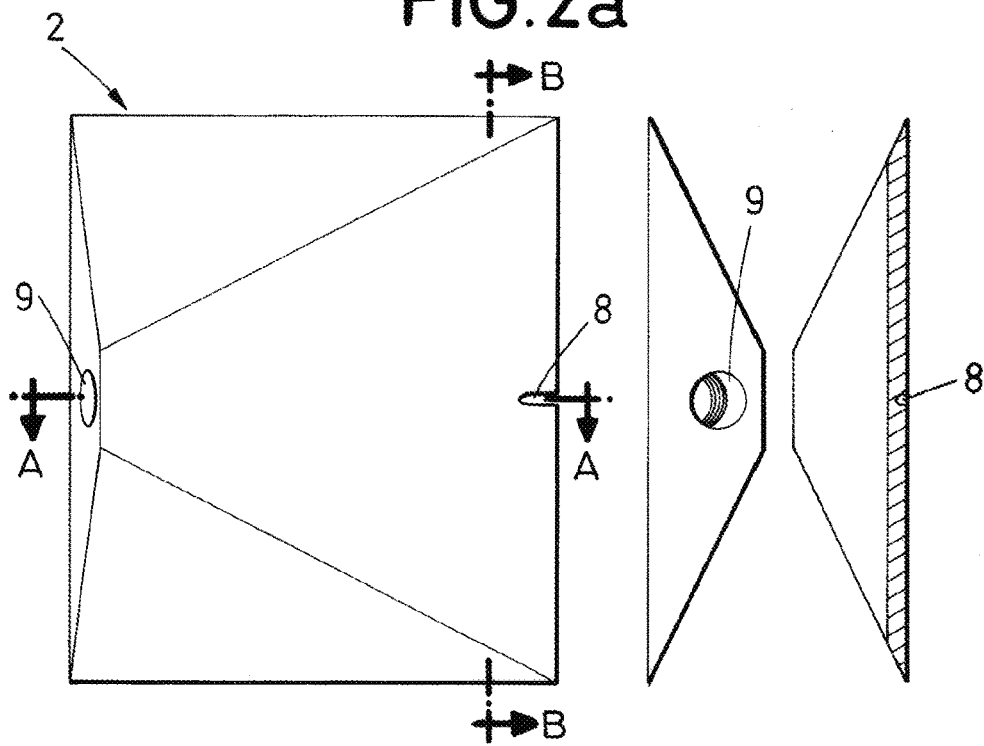

As FIG. 2a shows, first and second bores 8, 9 are provided at opposing lateral surfaces of the prism 2. The first bore 8 is configured to receive the input optical fiber 21 embedded in the composite structure 20, while the second bore 9 is configured to receive the first connection element 3.

Figure 2D:
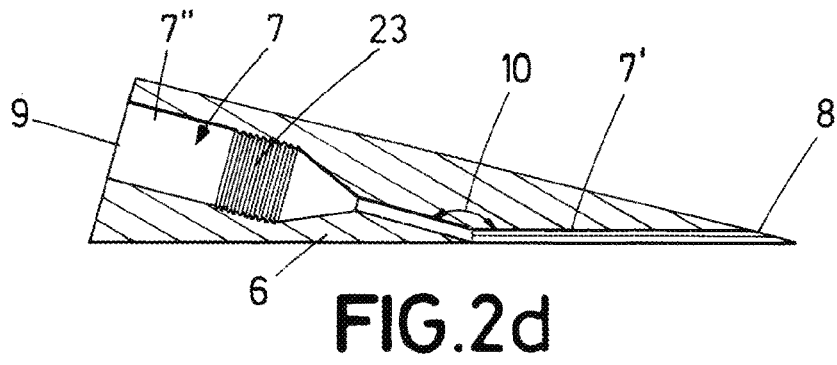

As shown in FIG. 2d, the inner conduit 7 of the prism 2 comprises two sections 7', 7" following different orientations, such as a ramp with an obtuse angle 10 being formed inside the prism. The ramp leads the input optical fiber 21 towards the input and output optical fibers 21, 22 connection. This way, the device 1 provides a smooth transition for connecting the embedded optical fiber with an exterior optical fiber.

As shown in FIG. 2d, and according to a preferred embodiment, a part of the inner conduit 7 of the prism 2 has a funnel shaped configuration. Further, according to another preferred embodiment, the inner conduit 7 of the prism 2 has a threaded inner surface 23.

Figure 3A:
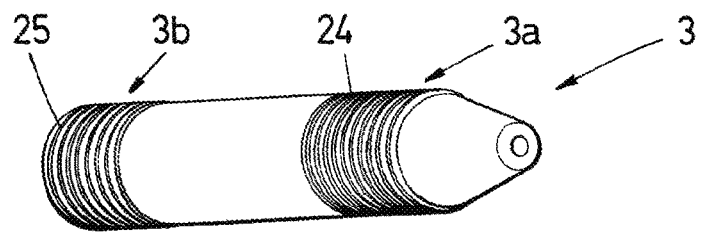
FIGS. 3a-3c show different views of a first connection element according to an embodiment of the invention.
Figure 3B:
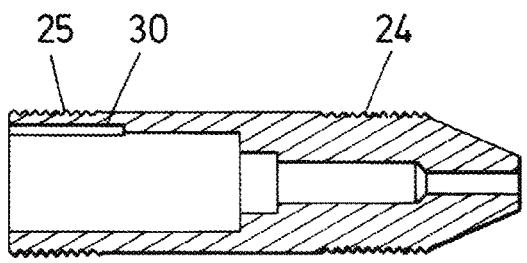
Figure 3C:
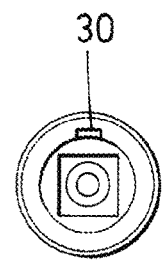

FIG. 3 shows a first connection element 3 according to a preferred embodiment. The first connection element 3 has a tubular shaped configuration with inner and outer ends 3a, 3b. The inner end 3a is configured to be inserted into the second bore 9 of the prism 2 to receive the input optical fiber 21. The outer end 3b is inwardly configured to receive the inner end 4a of the second connection element 4, and outwardly configured to receive the closure 5. To receive the second connection element 4, the outer end 3b of first connection element 3 has an inner box 30, and to receive the closure 5, the outer end 3b of first connection element 3 has a threaded outer surface 25.

The connection between the first 3 and second connection element 4 admit a unique position, the right one according to the polish angle in the ferrules, as consequence of the keyway and key machined in both respectively first and second connection elements.

Preferably, as shown in FIGS. 3a-3b, the inner end 3a of the first connection element 3 has a nozzle-shaped configuration that mates with a funnel shaped configuration provided at the inner conduit 7 of the prism 2 (FIG. 2d) to ease the connection between them.

Likewise, as preferably shown in FIGS. 3a-3b, the inner end 3a of the first connection element 3 has a threaded outer surface 24 threaded with a threaded inner surface 23 provided at the inner conduit 7 of the prism 2. This way, the device 1 provides a resistant connection between the prism 2 and the first connection element 3.

Figure 4A:
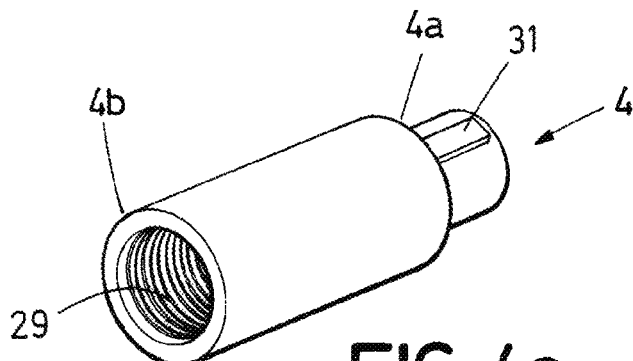
FIGS. 4a-4c show different views of a second connection element according to an embodiment of the invention.
Figure 4B:
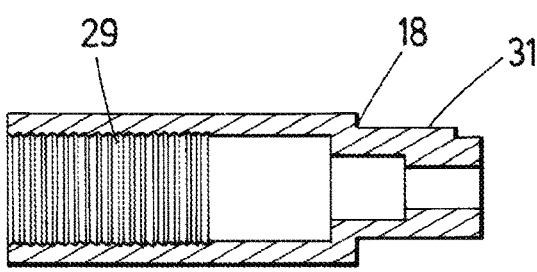
Figure 4C:
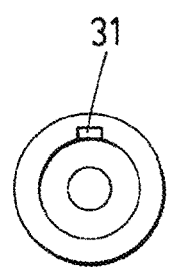

FIG. 4 shows a second connection element 4 according to a preferred embodiment. The second connection element 4 has a tubular shaped configuration with inner and outer ends 4a, 4b. The inner end 4a is configured to be inserted into the first connection element 3, and the outer end 4b is configured to receive an output optical fiber 22. To receive the first connection element 3, the inner end 4a of the second connection element 4 has an outer protrusion 31 configured to be received by the inner box 30 of the outer end 3b of first connection element 3. The device 1 thus provides a unique position for the connection, which allows providing an optimal optic alignment with minimum optical insertion losses.

Preferably, as shown in FIGS. 4a-4b, the inner end 3a of the first connection element 3 has a nozzle-shaped configuration that mates with a funnel shaped configuration provided at the inner conduit 7 of the prism 2 (FIG. 2d) to ease the connection between them.

As shown in FIGS. 4a-4b, and according to a preferred embodiment, the outer end 4b of the second connection element 4 has a threaded inner surface 29 to receive and retain a piece (e.g., a stopper 19) adapted to maintain the elastic element 13 pressing the inner and outer ferrules 11, 12 together to thus allow the fibers 21, 22 connection.

FIG. 5 shows a closure 5 according to a preferred embodiment. The closure 5 has a tubular shaped configuration with inner and outer ends 5a, 5b. The closure 5 is configured to be disposed around the outer ends 4b, 3b of the second and first connection elements 4, 3 to close the first and second connection elements 3, 4 together.

Figure 5A:
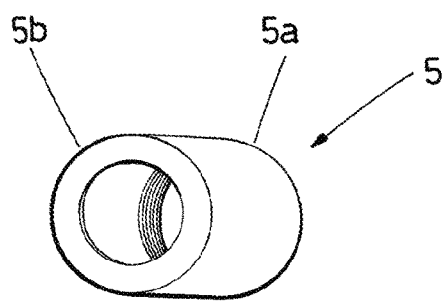
FIGS. 5a-5c show different views of an optical fiber connection device according to an embodiment of the present invention.
Figures 5B, 5C:
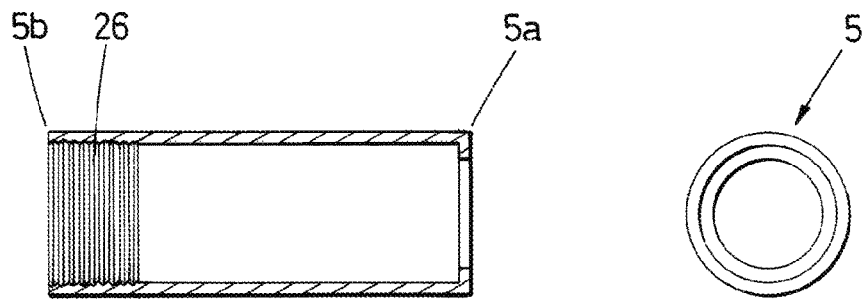

Preferably, as shown in FIGS. 5a-5b, the inner end 5a of the closure 5 has a threaded inner surface 26 threaded with a threaded outer surface 25 provided at the outer end 3b of the first connection element 3. This way, the device 1 provides a resistant connection between the first and second connection elements 3, 4.

Further to the prism 2, the first and second connection elements 3, 4, and the closure 5, the optical fiber connection device 1 also comprises inner and outer ferrules 11, 12, and an elastic element 13. FIGS. 6 to 8 show longitudinal sectional views of the optical fiber connection device 1 in which the ferrules 11, 12 and the elastic element 13 can be appreciated.

As shown in FIG. 6, the input optical fiber 21 end is received by the inner ferrule 11, and the output optical fiber 22 end is received by the outer ferrule 12.

Preferably, the inner and the outer ferrules 11, 12 has inclined basis (no transversal) to provide an inclined connection plane between thereof. This ferrules configuration helps to further reduce the insertion losses.

As shown in FIGS. 7-8, the both ferrules 11, 12 are consecutively disposed along the inner end 4a of the second connection element 4, providing this way a tight connection between the input and output optical fibers 21, 22.

As also shown in FIGS. 7-8, the elastic element 13 retained into the outer end 4b of the second connection element 4 presses the inner and outer ferrules 11, 12 together, to thus connect the input and output optical fibers 21, 22.

According to a preferred embodiment, the optical fiber connection device 1 further comprises an inner connector 14 having a tubular shaped configuration allocated into the inner end 3a of the first connection element 3 to provide a tight connection between the input optical fiber 21 end and the inner ferrule 11, and an outer connector 15 having a tubular shaped configuration allocated into the outer end 4b of the second connection element 4 to provide a tight connection between the output optical fiber end 22 and the outer ferrule 12.

According to another preferred embodiment, a tubular sheath 16 can be coaxially disposed around the inner 11 and the outer ferrule 12 to further protect the input and output optical fibers 21, 22 connection.

In addition, the optical fiber connection device 1 can be configured to ensure that the fiber connection occurs at a desired position. According to this, the second connection element 4 may have a shoulder 18 between the inner and the outer end 4a, 4b, and contacting the outer end 3b of the first connection element 3.

Likewise, according to another preferred embodiment, the closure 5 has an outer end 5b with an outward projection 17 that mates with the outer end 4b of the second connection element 4, to thus close the first and second connection element 3, 4 at a desired position.

As shown in FIGS. 7-8, and according to another preferred embodiment, the optical fiber connection device 1 further comprises a stopper 19 configured to be inserted into the outer end 4b of the second connection element 4 to maintain the elastic element 13 pressing the inner and outer ferrules 11, 12 together.

Preferably, the stopper 19 has a threaded outer surface 27 and an outward flared surface 28, the threaded outer surface 27 threaded with a threaded inner surface 29 provided at the outer end 4b of the second connection element 4, and the outward flared surface 28 configured to retain the first and second connection element 3, 4 at a desired position.

Preferably, the outward flared surface 28 of the stopper 19 contacts the outward projection 17 of the closure 5 to retain the first and second connection element 3, 4 at a desired position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An optical fiber connection device comprising:
    a metallic prism having a planar base to lay on a composite structure, the prism having an inner conduit connecting opposing lateral surfaces of the prism, the conduit ending in a first and second bores, the first bore being configured to receive an input optical fiber embedded in the composite structure,
    a first connection element having a tubular shaped configuration with inner and outer ends, the inner end configured to be inserted into the second bore of the prism to receive the input optical fiber, and
    a second connection element having a tubular shaped configuration with inner and outer ends, the inner end configured to be inserted into the first connection element, and the outer end configured to receive an output optical fiber,
        the outer end of first connection element having an inner box configured to receive an outer protrusion provided at the inner end of the second connection element to provide a unique position for the connection of the input and output optical fibers,
        the inner conduit of the prism comprising two sections following different orientations, said orientations forming a ramp to lead the input optical fiber towards the input and output optical fibers connection,
        inner and outer ferrules to respectively receive the input and output optical fiber ends,
        the inner and outer ferrules being consecutively disposed along the inner end of the second connection element to provide a tight connection between the input and output optical fibers,
    an elastic element retained into the outer end of the second connection element pressing the inner and outer ferrules together, to thus connect the input and output optical fibers,
    wherein the inner conduit of the prism has a threaded inner surface threaded with a threaded outer surface provided at the inner end of the first connection element.

2. The optical fiber connection device according to claim 1, further comprising:
    an inner connector having a tubular shaped configuration allocated into the inner end of the first connection element to provide a tight connection between the input optical fiber end and the inner ferrule, and
    an outer connector having a tubular shaped configuration allocated into the outer end of the second connection element to provide a tight connection between the output optical fiber end and the outer ferrule.

3. The optical fiber connection device according to claim 1, further comprising a tubular sheath coaxially disposed around the inner and the outer ferrule.

4. The optical fiber connection device according to claim 1, further comprising a closure coaxially disposed around the outer end of the second and first connection element to close the first and second connection element together.

5. The optical fiber connection device according to claim 1, wherein the second connection element has a shoulder between the inner and the outer end, the shoulder contacting the outer end of the first connection element to retain the first and second connection element at a desired position.

6. The optical fiber connection device according to claim 1, further comprising a stopper configured to be inserted into the outer end of the second connection element to maintain the elastic element pressing the inner and outer ferrules together.

7. An optical fiber connection device comprising:
    a metallic prism having a planar base to lay on a composite structure, the prism having an inner conduit connecting opposing lateral surfaces of the prism, the conduit ending in a first and second bores, the first bore being configured to receive an input optical fiber embedded in the composite structure,
    a first connection element having a tubular shaped configuration with inner and outer ends, the inner end configured to be inserted into the second bore of the prism to receive the input optical fiber, and
    a second connection element having a tubular shaped configuration with inner and outer ends, the inner end configured to be inserted into the first connection element, and the outer end configured to receive an output optical fiber,
        the outer end of first connection element having an inner box configured to receive an outer protrusion provided at the inner end of the second connection element to provide a unique position for the connection of the input and output optical fibers,
        the inner conduit of the prism comprising two sections following different orientations, said orientations forming a ramp to lead the input optical fiber towards the input and output optical fibers connection,
        inner and outer ferrules to respectively receive the input and output optical fiber ends, the inner and outer ferrules being consecutively disposed along the inner end of the second connection element to provide a tight connection between the input and output optical fibers, an elastic element retained into the outer end of the second connection element pressing the inner and outer ferrules together, to thus connect the input and output optical fibers, and a closure coaxially disposed around the outer end of the second and first connection element to close the first and second connection element together, wherein the closure has an outer end with an outward projection that mates with the outer end of the second connection element to close the first and second connection element at a desired position.

8. An optical fiber connection device comprising:

a metallic prism having a planar base to lay on a composite structure, the prism having an inner conduit connecting opposing lateral surfaces of the prism, the conduit ending in a first and second bores, the first bore being configured to receive an input optical fiber embedded in the composite structure, a first connection element having a tubular shaped configuration with inner and outer ends, the inner end configured to be inserted into the second bore of the prism to receive the input optical fiber, and a second connection element having a tubular shaped configuration with inner and outer ends, the inner end configured to be inserted into the first connection element, and the outer end configured to receive an output optical fiber, the outer end of first connection element having an inner box configured to receive an outer protrusion provided at the inner end of the second connection element to provide a unique position for the connection of the input and output optical fibers, the inner conduit of the prism comprising two sections following different orientations, said orientations forming a ramp to lead the input optical fiber towards the input and output optical fibers connection, inner and outer ferrules to respectively receive the input and output optical fiber ends, the inner and outer ferrules being consecutively disposed along the inner end of the second connection element to provide a tight connection between the input and output optical fibers, an elastic element retained into the outer end of the second connection element pressing the inner and outer ferrules together, to thus connect the input and output optical fibers, and a stopper configured to be inserted into the outer end of the second connection element to maintain the elastic element pressing the inner and outer ferrules together, wherein the closure has a threaded inner surface threaded with a threaded outer surface provided at the outer end of the first connection element.

9. An optical fiber connection device comprising:

a metallic prism having a planar base to lay on a composite structure, the prism having an inner conduit connecting opposing lateral surfaces of the prism, the conduit ending in a first and second bores, the first bore being configured to receive an input optical fiber embedded in the composite structure, a first connection element having a tubular shaped configuration with inner and outer ends, the inner end configured to be inserted into the second bore of the prism to receive the input optical fiber, and a second connection element having a tubular shaped configuration with inner and outer ends, the inner end configured to be inserted into the first connection element, and the outer end configured to receive an output optical fiber, the outer end of first connection element having an inner box configured to receive an outer protrusion provided at the inner end of the second connection element to provide a unique position for the connection of the input and output optical fibers, the inner conduit of the prism comprising two sections following different orientations, said orientations forming a ramp to lead the input optical fiber towards the input and output optical fibers connection, inner and outer ferrules to respectively receive the input and output optical fiber ends, the inner and outer ferrules being consecutively disposed along the inner end of the second connection element to provide a tight connection between the input and output optical fibers, an elastic element retained into the outer end of the second connection element pressing the inner and outer ferrules together, to thus connect the input and output optical fibers, and a closure coaxially disposed around the outer end of the second and first connection element to close the first and second connection element together, wherein the stopper has a threaded outer surface and an outward flared surface, the threaded outer surface threaded with a threaded inner surface provided at the outer end of the second connection element, and the outward flared surface configured to retain the first and second connection element at a desired position.

10. The optical fiber connection device according to claim 9, further comprising a closure coaxially disposed around the outer end of the second and first connection element to close the first and second connection element together, wherein the closure has an outer end with an outward projection that mates with the outer end of the second connection element to close the first and second connection element at a desired position, and wherein the outward flared surface of the stopper contacts the outward projection of the closure to retain the first and second connection element at a desired position.

11. A composite structure for an aircraft, comprising an optical fiber connection device comprising:

a metallic prism having a planar base to lay on a composite structure, the prism having an inner conduit connecting opposing lateral surfaces of the prism, the conduit ending in a first and second bores, the first bore being configured to receive an input optical fiber embedded in the composite structure, a first connection element having a tubular shaped configuration with inner and outer ends, the inner end configured to be inserted into the second bore of the prism to receive the input optical fiber, and a second connection element having a tubular shaped configuration with inner and outer ends, the inner end configured to be inserted into the first connection element, and the outer end configured to receive an output optical fiber, the outer end of first connection element having an inner box configured to receive an outer protrusion provided at the inner end of the second connection element to provide a unique position for the connection of the input and output optical fibers, the inner conduit of the prism comprising two sections following different orientations, said orientations forming a ramp to lead the input optical fiber towards the input and output optical fibers connection, inner and outer ferrules to respectively receive the input and output optical fiber ends, the inner and outer ferrules being consecutively disposed along the inner end of the second connection element to provide a tight connection between the input and output optical fibers, an elastic element retained into the outer end of the second connection element pressing the inner and outer ferrules together, to thus connect the input and output optical, and an outer composite layer, wherein the outer composite layer is disposed on the optical fiber connection device.

12. An optical fiber connection device comprising:

a metallic prism having a planar base to lay on a composite structure, the prism having an inner conduit connecting opposing lateral surfaces of the prism, the conduit ending in a first and second bores, the first bore being configured to receive an input optical fiber embedded in the composite structure, a first connection element having a tubular shaped configuration with inner and outer ends, the inner end configured to be inserted into the second bore of the prism to receive the input optical fiber, and a second connection element having a tubular shaped configuration with inner and outer ends, the inner end configured to be inserted into the first connection element, and the outer end configured to receive an output optical fiber, the outer end of first connection element having an inner box configured to receive an outer protrusion provided at the inner end of the second connection element to provide a unique position for the connection of the input and output optical fibers, the inner conduit of the prism comprising two sections following different orientations, said orientations forming a ramp to lead the input optical fiber towards the input and output optical fibers connection, inner and outer ferrules to respectively receive the input and output optical fiber ends, the inner and outer ferrules being consecutively disposed along the inner end of the second connection element to provide a tight connection between the input and output optical fibers, an elastic element retained into the outer end of the second connection element pressing the inner and outer ferrules together, to thus connect the input and output optical, wherein the first connection element has an inner end with a nozzle-shaped configuration that mates with a funnel shaped configuration provided at the inner conduit of the prism to ease the connection between them.

13. The optical fiber connection device according to claim 12, wherein the second connection element has a shoulder between the inner and the outer end, the shoulder contacting the outer end of the first connection element to retain the first and second connection element at a desired position.

14. The optical fiber connection device according to claim 12, further comprising a stopper configured to be inserted into the outer end of the second connection element to maintain the elastic element pressing the inner and outer ferrules together.

15. The optical fiber connection device according to claim 12, further comprising:

an inner connector having a tubular shaped configuration allocated into the inner end of the first connection element to provide a tight connection between the input optical fiber end and the inner ferrule, and an outer connector having a tubular shaped configuration allocated into the outer end of the second connection element to provide a tight connection between the output optical fiber end and the outer ferrule.

16. The optical fiber connection device according to claim 12, further comprising a tubular sheath coaxially disposed around the inner and the outer ferrule.

17. The optical fiber connection device according to claim 12, further comprising a closure coaxially disposed around the outer end of the second and first connection element to close the first and second connection element together.

* * * * *